(12) United States Patent
Takahashi

(10) Patent No.: US 7,524,588 B2
(45) Date of Patent: Apr. 28, 2009

(54) NONAQUEOUS SECONDARY BATTERY

(75) Inventor: Kentaro Takahashi, Moriguchi (JP)

(73) Assignee: Sanyo Electric C.o., Ltd., Moriguchi-shi (JP)

( * ) Notice: Subject to any disclaimer, the term of this patent is extended or adjusted under 35 U.S.C. 154(b) by 209 days.

(21) Appl. No.: 11/785,288

(22) Filed: Apr. 17, 2007

(65) Prior Publication Data

US 2007/0243471 A1    Oct. 18, 2007

(30) Foreign Application Priority Data

Apr. 18, 2006   (JP)   ............................. 2006-114654

(51) Int. Cl.
*H01M 6/16* (2006.01)

(52) U.S. Cl. .................. 429/330; 429/329; 429/331; 429/326; 429/327; 429/231.8; 429/231.4; 429/231.95

(58) Field of Classification Search ................. 429/330, 429/329, 331, 326, 327, 231.8, 231.4, 231.95
See application file for complete search history.

(56) References Cited

FOREIGN PATENT DOCUMENTS

| | | |
|---|---|---|
| JP | 08-045545 A | 2/1996 |
| JP | 2000-268859 A | 9/2000 |
| JP | 2001-006729 A | 1/2001 |
| JP | 2001-202991 A | 7/2001 |
| JP | 2002-352852 A | 12/2002 |
| JP | 2003-151623 A | 5/2003 |

*Primary Examiner*—Laura S Weiner

(74) *Attorney, Agent, or Firm*—Westerman, Hattori, Daniels & Adrian, LLP.

(57) ABSTRACT

A nonaqueous secondary battery includes a negative electrode using a negative electrode active material containing a carbonaceous material; a positive electrode using a positive electrode active material capable of reversibly intercalating and deintercalating lithium; and a nonaqueous electrolyte. The nonaqueous electrolyte contains:
(1) a vinyl ethylene carbonate derivative represented by Formula (I):

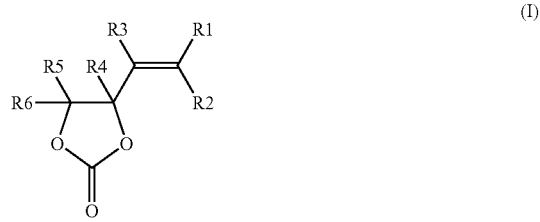

wherein R1 to R6 independently represent a hydrogen atom or an alkyl group having a carbon number of 1 to 4;
(2) a cyclic acid anhydride; and
(3) at least one cyclic ether derivative selected from the group consisting of 1,3-dioxanes, 1,3-dioxolanes and derivatives thereof.

Accordingly, a nonaqueous secondary battery can be obtained which is excellent in charging load property and cycle property at room temperature and at high temperatures and in which even when the battery is preserved in a charged state in a high temperature atmosphere, not only remaining capacity is large, but also the amount of generated gas is small.

8 Claims, No Drawings

NONAQUEOUS SECONDARY BATTERY

FIELD OF THE INVENTION

The present invention relates to a nonaqueous secondary battery. Particularly, the present invention relates to a nonaqueous secondary battery in which the decomposition of an electrolyte in a negative electrode is suppressed and an impedance of a negative electrode surface coating is lowered and which not only is excellent in charging load property and cycle property at room temperature and higher temperatures, but also has such an advantage that when the battery is preserved in a charged state in a high temperature atmosphere, remaining capacity is large and the amount of generated gas is small.

BACKGROUND OF THE INVENTION

With the rapid spread of portable electronic equipment, the specifications required of the batteries used in such equipment have become more stringent with every year, and there is particular requirement for batteries that are compact and thin, have high capacity and superior cycling characteristics, and give stable performance. In the field of secondary batteries, attention is focusing on lithium nonaqueous electrolyte secondary batteries, which have high energy density compared with other batteries. These lithium nonaqueous electrolyte secondary batteries are winning an increasingly large share of the secondary battery market.

A lithium nonaqueous secondary battery includes: a negative electrode produced by applying a negative electrode active material mixture to both surfaces of a negative electrode substance including a copper foil in the form of an elongate sheet or the like, in the form of a coating; a positive electrode produced by applying a positive electrode active material mixture to both surfaces of a positive electrode substance including an aluminum foil in the form of an elongate sheet or the like, in the form of a coating; and a separator including a microporous polyolefin film or the like disposed between the negative and positive electrodes, and the negative and positive electrodes which are insulated from each other are wound in the form of a column or an oval to form a wound electrode body. In the case of a rectangular battery, a wound electrode body which is crushed into a flat form and in which negative and positive electrode current-collecting tabs are connected to a predetermined part of negative and positive electrodes, respectively, is accommodated in an outer packing in a predetermined form.

With respect to a 4-V-class nonaqueous secondary battery having a particularly high energy density among the lithium nonaqueous secondary batteries, as a positive electrode active material thereof, a material including a lithium compound oxide capable of reversibly intercalating and deintercalating lithium, such as $LiCoO_2$, $LiNiO_2$, $LiMnO_2$, $LiMn_2O_4$ and $LiFeO_2$ is used. As a negative electrode active material, carbonaceous materials, lithium or lithium alloys, metal oxides capable of intercalating and deintercalating lithium, for example, are used. Among them, particularly a negative electrode active material including a graphite material is widely used, since such a negative electrode active material has not only high safety, because while it has a discharge potential compared to a lithium metal or lithium alloys, a dendrite does not grow in it, but also such excellent properties as excellent initial efficiency, advantageous potential flatness and high density.

It is necessary that nonaqueous solvents (organic solvents) used in the above-noted nonaqueous secondary batteries have a high dielectric constant to electrolytically dissociate electrolytes and a high ion-conductivity in a wide range of temperatures. Examples of the nonaqueous solvents include organic solvents, for instance carbonates, such as propylene carbonate (PC), ethylene carbonate (EC), butylene carbonate (BC), dimethyl carbonate (DMC), diethyl carbonate (DEC) and ethylmethyl carbonate (EMC); lactones, such as γ-butylolactone; ethers; ketones; and esters. Particularly, a solvent mixture including EC and a noncyclic carbonate having a low viscosity, such as DMC, DEC and EMC is widely used.

However, in a nonaqueous secondary battery using the above-noted organic solvent, when a carbonaceous material, such as graphite and amorphous carbon is used as a negative electrode active material, an organic solvent is reductively decomposed on an electrode surface during a charging or discharging process and a negative electrode impedance is enlarged due to gas generation, deposition of by-products or the like, so that it is known that a disadvantage is caused wherein a charging and discharging efficiency is lowered and the cycle property is impaired, for example.

Thus, in related art, for suppressing a reductive decomposition of an organic solvent, various compounds are added to a nonaqueous electrolyte and for preventing a direct reaction of a negative electrode active material with an organic solvent, a technique for controlling a negative electrode surface coating (hereinafter, referred to as the solid electrolyte interface (SEI) surface coating) which is also referred to as a passivated layer has been important. For example, JP-A-8-045545 and JP-A-2001-006729 disclose a method comprising: adding at least one compound selected from the group consisting of vinylene carbonate (VC) and a derivative thereof into a nonaqueous electrolyte of a nonaqueous secondary battery; forming an SEI surface coating on a negative electrode active material by causing the above-noted additive to reductively decompose itself on a negative electrode surface before the insertion of lithium into a negative electrode by a first charging; and causing the SEI surface coating to function as a barrier for preventing the insertion of solvent molecules surrounding lithium ions.

JP-A-2001-006729 discloses a method in which for the same object as above, vinylethylene carbonate (VEC) or a derivative thereof is added into a nonaqueous electrolyte as an additive; JP-A-2001-202991 discloses a method in which for the same object as above, ketones are added; JP-A-2003-151623 discloses a method in which for the same object as above, an additive including VEC and at least one compound selected from the group consisting of VC, a cyclic sulfonic acid or cyclic sulfate ester and a cyclic acid anhydride is added; JP-A-2000-268859 discloses a method in which for the same object as above, a cyclic acid anhydride is added; and JP-A-2002-352852 discloses a method in which for the same object as above, an additive including VEC or a derivative thereof and a cyclic acid anhydride is added.

SUMMARY

However, with respect to an SEI surface coating obtained by adding one of the above-noted additives disclosed in the above-noted patent documents, when the amount of the additive is increased for expecting more efficiency for suppressing reductive decomposition of an electrolyte, only an SEI surface coating having a low lithium ion conductivity and a high resistance can be obtained. Consequently, a negative electrode impedance is extremely increased, so that a disadvantage has been caused wherein lithium receiving properties of a negative electrode are impaired. On the other hand, JP-A-2002-352852 discloses that by incorporating a cyclic acid anhydride, such as succinic anhydride into VEC or a derivative thereof, a strong reductive-decomposition suppressing action in a negative electrode can be obtained even with a small amount of an additive and cycle property is improved. However, when a charging and discharging cycle is repeated in a high temperature atmosphere of 60° C. or more, not only is an SEI surface coating likely to have a high resistance, but also swelling of the battery due to an increasing oxide film resistance of a positive electrode and the generation of decomposition gas become more obvious, so that cycle property at high temperatures may be largely impaired.

The present inventor has made extensive and intensive studies with a view toward solving the problems of a nonaqueous secondary battery using the above-noted nonaqueous electrolyte including at least VEC or a derivative thereof and a cyclic acid anhydride. As a result, it has been found that when a nonaqueous electrolyte further includes 1,3-dioxane, 1,3-dioxolane or a derivative thereof, by virtue of a synergism of the both, not only lithium receiving properties in a negative electrode during the charging is largely improved, but also the increase of a coating resistance and the gas generation in positive and negative electrodes in a high temperature atmosphere can be largely improved. Based on this finding, the present invention has been completed.

The reason why such a result can be obtained is not yet clear and it is necessary to wait for future studies; however, it is also assumed that by the incorporation of a part of 1,3-dioxane, 1,3-dioxolane or a derivative thereof into an SEI coating, a negative electrode SEI coating excellent in lithium ion conductivity would be produced. In addition, it is also assumed that since at high temperatures, 1,3-dioxane, 1,3-dioxolane or a derivative thereof is preferentially oxidatively-decomposed on a positive electrode surface to form an oxide coating, continuous oxidative decomposition of VEC or a nonaqueous solvent is suppressed, and further since floating of an oxidation product of a nonaqueous electrolyte to a negative electrode is decreased, the increase of a negative electrode resistance is simultaneously suppressed.

An advantage of some aspects of the present invention is to provide a nonaqueous secondary battery which is excellent in charging load property and cycle properties at room temperature and high temperatures and in which even when the battery is preserved in a charged state in a high temperature atmosphere, not only remaining capacity is large, but also the amount of generated gas is small.

A nonaqueous secondary battery according to a first aspect of the present invention includes: a negative electrode using a negative electrode active material containing a carbonaceous material capable of reversibly intercalating and deintercalating lithium, or a mixture of the carbonaceous material and at least one selected from the group consisting of lithium, lithium alloys and metal oxides capable of intercalating and deintercalating lithium; a positive electrode using a positive electrode active material capable of reversibly intercalating and deintercalating lithium; and a nonaqueous electrolyte. The nonaqueous electrolyte contains:

(1) a vinyl ethylene carbonate (VEC) derivative represented by Formula (I):

[Chemical 1]

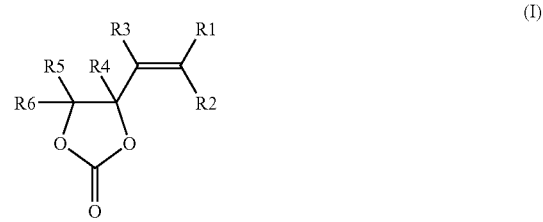

wherein R1 to R6 independently represent a hydrogen atom or an alkyl group having a carbon number of 1 to 4;

(2) a cyclic acid anhydride; and (3) at least one cyclic ether derivative selected from the group consisting of 1,3-dioxanes, 1,3-dioxolanes and derivatives thereof.

In the present aspect, it is essential that in the nonaqueous electrolyte, at least one cyclic ether derivative selected from the group consisting of 1,3-dioxanes, 1,3-dioxolanes and derivatives thereof coexists with a VEC derivative represented by the above Formula (I) and a cyclic acid anhydride. In the nonaqueous electrolyte, even when a VEC derivative represented by the above Formula (I) and a cyclic acid anhydride coexist, when at least one cyclic ether derivative selected from the group consisting of 1,3-dioxanes, 1,3-dioxolanes and derivatives thereof is not included, during repeated charging and discharging cycles in a high temperature atmosphere of 60° C. or more, the generation of decomposition gas and swelling of the battery becomes more obvious, so that cycle property at high temperatures is largely impaired.

Examples of an organic solvent which can be used in the nonaqueous secondary battery according to the present aspect include carbonates, lactones, ethers and esters. These solvents can also be used in combination thereof. Specific examples of the organic solvent include carbonates, such as ethylene carbonate (EC), propylene carbonate (PC), butylene carbonate (BC), dimethyl carbonate (DMC), diethyl carbonate (DEC) and ethyl methyl carbonate (EMC); γ-butyrolactone; γ-valerolactone; γ-dimethoxyethane; tetrahydrofuran; and 1,4-dioxane. From the viewpoint of enhancing a charge discharge efficiency, a solvent mixture of chain carbonates, such as EC and DMC, DEC or EMC is advantageously used.

Examples of the electrolyte include lithium salts, such as lithium perchloride (LiClO$_4$), lithium hexafluorophosphate (LiPF$_6$), lithium tetrafluoroborate (LiBF$_4$), lithium hexafluoroarsenate (LiAsF$_6$), lithium trifluoromethyl sulfonate (LiCF$_3$SO$_3$) and bistrifluoromethylsulfonylimide lithium (LiN(CF$_3$SO$_2$)$_2$). Among them, LiPF$_6$ and LiBF$_4$ are preferably used and the amount of a Li salt dissolved in the nonaqueous solvent is preferably 0.5 to 2.0 mol/L.

As the positive electrode active material, a lithium-transition metal compound oxide represented by the formula: Li$_x$MO$_2$ (wherein, M represents at least one of Co, Ni and Mn), capable of reversibly intercalating and deintercalating lithium, is used. Examples of such a lithium-transition metal compound oxide include LiCoO$_2$, LiNiO$_2$, LiNi$_y$Co$_{1-y}$O$_2$ (y=0.01 to 0.99), LiMnO$_2$, LiMn$_2$O$_4$ and LiCo$_x$Mn$_y$Ni$_z$O$_2$ (x+y+z=1). These compound oxides can be used singly or in combination.

As the negative electrode active material, used is a mixture of at least one compound selected from the group consisting of a carbonaceous material, siliceous material and metal oxide capable of reversibly intercalating and deintercalating lithium.

In the present aspect, the VEC derivative is at least one compound selected from the group consisting of 4-ethenyl-1,3-dioxolane-2-one (VEC), 4-ethenyl-4-methyl-1,3-dioxolane-2-one, 4-ethenyl-4-ethyl-1,3-dioxolane-2-one, 4-ethenyl-4-n-propyl-1,3-dioxolane-2-one, 4-ethenyl-5-methyl-1,3-dioxolane-2-one, 4-ethenyl-5-ethyl-1,3-dioxolane-2-one and 4-ethenyl-5-n-propyl-1,3-dioxolane-2-one. These compounds can be also used in combination.

In the present aspect, the amount of the VEC derivative is 0.01% by mass to 10.0% by mass relative to the mass of the total amount of the electrolyte. When the amount of the VEC derivative is more than 10.0% by mass relative to the mass of the total amount of the electrolyte, the impedance of the VEC surface coating becomes too large, so that charging load property is impaired. On the other hand, when the amount of the VEC derivative is less than 0.01% by mass relative to the mass of the total amount of the electrolyte, the effect of the present invention is unlikely to be obtained. A more preferred amount of the VEC derivative is 0.05% by mass to 5.0% by mass relative to the mass of the total amount of the electrolyte.

In the present aspect, the cyclic acid anhydride is at least one compound selected from the group consisting of succinic anhydride, methylsuccinic anhydride, 2,2-dimethylsuccinic anhydride, glutaric anhydride, 1,2-cyclohexanedicarboxylic anhydride, cis-1,2,3,6-tetrahydrophthalic anhydride, cis-5-norbornene-endo-2,3-dicarboxylic anhydride, phenylsuccinic anhydride, 2-phenylglutaric anhydride and nonenylsuccinic anhydride.

In the present aspect, the amount of the cyclic acid anhydride is 0.01% by mass to 10.0% by mass relative to the mass of the total amount of the electrolyte. When the amount of the cyclic acid anhydride is more than 10.0% by mass relative to the mass of the total amount of the electrolyte, the impedance of the SEI coating becomes too large, so that charging load property is impaired. On the other hand, when the amount of the cyclic acid anhydride is less than 0.01% by mass relative to the mass of the total amount of the electrolyte, the effect of the present invention is unlikely to be obtained. A more preferred amount of the cyclic acid anhydride is 0.05% by mass to 5.0% by mass relative to the mass of the total amount of the electrolyte.

In the present aspect, the cyclic ether derivative is at least one compound selected from the group consisting of 1,3-dioxane, 2-methyl-1,3-dioxane, 4-methyl-1,3-dioxane, 2,4-dimethyl-1,3-dioxane, 4-ethyl-1,3-dioxane, 1,3-dioxolane, 2-methyl-1,3-dioxolane and 4-methyl-1,3-dioxolane.

In the present aspect, the amount of the cyclic ether derivative is 0.01% by mass to 10.0% by mass relative to the mass of the total amount of the electrolyte.

When the amount of the cyclic ether derivative is more than 10.0% by mass relative to the mass of the total amount of the electrolyte, the positive electrode coating resistance becomes large, so that cycle property is impaired. On the other hand, when the amount of the cyclic ether derivative is less than 0.01% by mass relative to the mass of the total amount of the electrolyte, the effect of the present invention is unlikely to be obtained. A more preferred amount of the cyclic ether derivative is 0.05% by mass to 5.0% by mass relative to the mass of the total amount of the electrolyte.

According to the present aspect of the invention, as described above, a nonaqueous secondary battery includes: a negative electrode using a negative electrode active material containing a carbonaceous material capable of reversibly intercalating and deintercalating lithium, or a mixture of the carbonaceous material and at least one selected from the group consisting of lithium, lithium alloys and metal oxides capable of intercalating and deintercalating lithium; a positive electrode using a positive electrode active material capable of reversibly intercalating and deintercalating lithium; and a nonaqueous electrolyte. The nonaqueous electrolyte contains:

(1) a VEC derivative represented by Formula (1):

[Chemical 2]

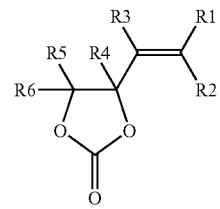

wherein R1 to R6 independently represent a hydrogen atom or an alkyl group having a carbon number of 1 to 4;

(2) a cyclic acid anhydride; and (3) at least one cyclic ether derivative selected from the group consisting of 1,3-dioxanes, 1,3-dioxolanes and derivatives thereof.

Accordingly, as specifically described hereinafter referring to embodiments and comparative examples, a nonaqueous secondary battery can be obtained which is excellent in charging load property and cycle properties at room temperature and high temperatures and in which even when the battery is preserved in a charged state in a high temperature atmosphere, not only remaining capacity is large, but also the amount of generated gas is small.

DESCRIPTION OF THE PREFERRED EMBODIMENTS

Hereinafter, preferred embodiments for carrying out the present invention are specifically described referring to embodiments and comparative examples. First, specific methods for manufacturing a nonaqueous secondary battery and methods for measuring various properties of a nonaqueous secondary battery, common to these embodiments and comparative examples, will be described.

Preparation of Positive Electrode Plate

By mixing a positive electrode active material including $LiCoO_2$ with a solution in which a conductant agent including carbon (e.g., 5% by mass), such as acetylene black and graphite, and a binder (e.g., 3% by mass) including polyvinylidene fluoride (PVdF) are dissolved in an organic solvent including N-methyl pyrrolidone (NMP), an active material slurry or paste is prepared. By homogeneously applying either the active material slurry using a dye coater or a doctor blade, or the active material paste by a roller coating method to both surfaces of a positive electrode substrate (e.g., an aluminum foil or mesh having a thickness of 15 μm), a positive electrode plate coated with an active material layer is prepared. Thereafter, by passing the positive electrode plate coated with the active material layer through a dryer, an organic solvent required for the preparation of the slurry or paste is removed and the positive electrode plate is dried. After the drying, the positive electrode plate is rolled with a roll-press machine to prepare a positive electrode plate having a thickness of 0.12 mm.

Preparation of Negative Electrode Plate

By solving and mixing a negative electrode active material including natural graphite (d(002) value=0.335 nm) and a binder (e.g., 3% by mass) including PVdF in an organic solvent including NMP, an active material slurry or paste is prepared. By homogeneously applying either the active material slurry using a dye coater or a doctor blade, or the active material paste by a roller coating method on both surfaces of a negative electrode substrate (e.g., a copper foil having a thickness of 10 μm), a negative electrode plate coated with an active material layer is prepared. Thereafter, by passing the negative electrode plate coated with the active material layer through a dryer, an organic solvent required for the preparation of the slurry or paste is removed and the negative electrode plate is dried. After the drying, the negative electrode plate is rolled with a roll-press machine to prepare a negative electrode plate having a thickness of 0.13 mm.

Preparation of Electrode Body

The positive and negative electrode plates are laminated with a microporous membrane (e.g., having a thickness of 0.016 mm) including a polyolefin resin having a low reactivity with an organic solvent and being inexpensive interposed therebetween, with the center lines of the positive and negative electrode plates in the width direction thereof agreeing with each other. Thereafter, the resultant laminated structure is wound with a wind-up machine and the last round part of the winding is fixed with an adhesive tape to prepare a wound electrode body. Next, this wound electrode body is pressed to prepare a flat electrode body to be used for the embodiments and comparative examples. The thus prepared flat electrode body is inserted into a receiving space of an aluminum laminated sheet having a five-layer structure of resin (nylon), adhesive, aluminum alloy, adhesive and resin (polypropylene) layers which has been prepared beforehand. Thereafter, the resin layer (polypropylene) in the aluminum laminated sheet at a top part where a positive electrode current collecting tab and a negative electrode current collecting tab protrude and at one side part are thermally welded with each other and sealed to form a sealed part.

Preparation of Electrolyte

An electrolyte is prepared by dissolving $LiPF_6$ in a solvent mixture having a mass ratio of EC:EMC:DEC=30:15:55, so that the electrolyte has a concentration of 1.0 M of $LiPF_6$. To the electrolyte, a VEC derivative, a cyclic acid anhydride and at least one cyclic ether derivative selected from the group consisting of 1,3-dioxanes, 1,3-dioxolanes and derivatives thereof are added so that electrolytes to be used for the embodiments and comparative examples have the formulations shown in Tables 1 and 2. All of the shown amounts of the above-noted additives are expressed in a mass ratio of an additive relative to the mass of an electrolyte. Each of the electrolyte is injected into the outer packing body prepared as described above through an opening thereof and the opening is sealed to prepare a lithium ion secondary battery to be used for the embodiments and comparative examples. The designed capacity of each obtained battery is 750 mAh.

Measurement of Charging Load Property

In the embodiments and comparative examples, each battery was charged at 23° C. using a constant current of 2 It=1500 mA, and a charged capacity until the battery voltage became 4.2 V was measured as a constant current charged capacity. Thereafter, while maintaining the battery voltage at 4.2 V, the battery was charged for three hours and all of the charged capacity charged from the start of the charging was measured as a total charged capacity. According to Formula (1):

Charging load property (%)=(Constant current charged capacity/Total charged capacity)×100   Formula (1), a charging load property was obtained.

Measurement of Cycle Property at Room Temperature

First, each battery was charged at 23° C. using a constant current of 1 It=750 mA and after the battery voltage reached 4.2 V, each battery was charged for three hours, while maintaining the battery voltage at 4.2 V. Thereafter, each battery was discharged at 23° C. using a constant current of 1 It until the battery voltage reached 2.75 V. The process up to this point was defined as one cycle. After 500 cycles of this process, a discharged capacity was measured and according to the following calculation equation:

Cycle property at room temperature (%)=(Discharged capacity after 500 cycles/Discharged capacity after one cycle)×100, cycle property at room temperature (%) was obtained.

Measurement of Cycle Property at 60° C.

First, each battery was charged at 60° C. using a constant current of 1 It and after the battery voltage reached 4.2 V, each battery was charged for three hours, while maintaining the battery voltage at 4.2 V. Thereafter, each battery was discharged at 60° C. using a constant current of 1 It until the battery voltage reached 2.75 V. The process up to this point was defined as one cycle. After 500 cycles of this process, a discharged capacity was measured and according to the following calculation equation:

Cycle property at 60° C. (%)=(Discharged capacity after 500 cycles/Discharged capacity after one cycle)×100, cycle property at 60° C. (%) was obtained.

Measurement of Preserving in a Charged State Property (Remaining Capacity Rate) at 80° C.

Each battery whose discharged capacity after one cycle was measured in the same manner as described in the above-noted measurement of cycle property at room temperature, was charged at 23° C. using a constant current of 1 It and after the battery voltage reached 4.2 V, each battery was charged for three hours, while maintaining the battery voltage at 4.2 V. Each battery in a charged state was left in a thermostat having a temperature of 80° C. for 96 hours and then left in an atmosphere having a temperature of 23° C. After the battery temperature reached equilibrium, each battery was discharged using a constant current of 1 It until the battery voltage reached 2.75 V to measure a discharged capacity after leaving the battery at a high temperature and according to the following calculation equation:

Remaining capacity rate (%)=(Discharged capacity after leaving the battery at a high temperature/Discharged capacity after one cycle)×100, the remaining capacity rate (%) was obtained. The results are shown in Table 1.

Measurement of Preserving in a Charged State Property (Amount of Generated Gas)

The amount of generated gas was measured in such a manner that, with respect to each battery whose remaining capacity rate (%) at 80° C. was measured, a part of the battery outer packing body was removed by cutting and a gas generated in the battery was collected in paraffin at 23° C., so that the volume of the generated gas was measured.

EMBODIMENTS 1 TO 13 AND COMPARATIVE EXAMPLES 1 TO 15

In Embodiments 1 to 13 and Comparative Examples 1 to 15,
(a) VEC itself as the VEC derivative,
(b) succinic anhydride as the cyclic acid anhydride, and
(c) 1,3-dioxane as the cyclic ether derivative, were employed and effects produced by the amounts of these compounds on the battery properties were examined.

First, the electrolyte included: no VEC, succinic anhydride or 1,3-dioxane for Comparative Example 1; 1% by mass of only one selected from the group consisting of VEC, succinic anhydride and 1,3-dioxane for Comparative Examples 2 to 4; 2% by mass of only one selected from the group consisting of VEC, succinic anhydride and 1,3-dioxane for Comparative Examples 5 to 7; 0.5% by mass of two selected from the group consisting of VEC, succinic anhydride and 1,3-dioxane for Comparative Examples 8 to 10; 1% by mass of two selected from the group consisting of VEC, succinic anhydride and 1,3-dioxane for Comparative Examples 11 to 13; 2% by mass of VEC and 1% by mass of 1,3-dioxane for Comparative Example 14; and 2% by mass of succinic anhydride and 1% by mass of 1,3-dioxane for Comparative Example 15. Each battery for Comparative Examples 1 to 15 was prepared using each of the above-noted electrolytes.

On the other hand, the electrolyte included: 1% by mass of 1,3-dioxane equally for Embodiments 1 to 8. In addition, 0.5% by mass of VEC and 0.5% by mass of succinic anhydride for Embodiment 1; 0.25% by mass of VEC and 0.25% by mass of succinic anhydride for Embodiment 2; 0.25% by mass of succinic anhydride (equally for Embodiments 3 to 5) and 2% by mass to 5% by mass (varied for Embodiments 3 to 5) of VEC for Embodiments 3 to 5; 0.25% by mass of VEC (equally for Embodiments 6 to 8) and 2% by mass to 5% by mass (varied for Embodiments 6 to 8) of succinic anhydride for Embodiments 6 to 8. For Embodiments 9 to 13, the electrolyte included 0.5% by mass of VEC and succinic anhydride each (equally for Embodiments 9 to 13) and 0.25% by mass to 5% by mass (varied for Embodiments 9 to 13) of 1,3-dioxane. Each battery for Embodiments 1 to 13 was prepared using the above-noted electrolytes.

With respect to each of the thus-prepared batteries for Comparative Examples 1 to 15 and Embodiments 1 to 13, charging load property, cycle property at room temperature, cycle property at 60° C. and preserving in a charged state property at 80° C. were measured. The results are shown in Table 1.

TABLE 1

| | VEC (mass %) | Succinic anhydride (mass %) | 1,3-dioxane (mass %) | Charging load property (%) | Cycle property Room temp. (%) | Cycle property 60° C. (%) | 80° C. Preserving in charged state property Generated gas amount (ml) | 80° C. Preserving in charged state property Remaining capacity rate (%) |
|---|---|---|---|---|---|---|---|---|
| Comparative 1 | 0 | 0 | 0 | 78 | 65 | 69 | 2.0 | 64 |
| Comparative 2 | 0 | 0 | 1 | 76 | 48 | 70 | 2.2 | 64 |
| Comparative 3 | 0 | 1 | 0 | 73 | 68 | 58 | 2.2 | 61 |
| Comparative 4 | 1 | 0 | 0 | 72 | 69 | 66 | 2.5 | 62 |
| Comparative 5 | 0 | 0 | 2 | 77 | 46 | 72 | 2.5 | 63 |
| Comparative 6 | 0 | 2 | 0 | 61 | 70 | 35 | 3.9 | 57 |
| Comparative 7 | 2 | 0 | 0 | 57 | 73 | 34 | 4.3 | 43 |
| Comparative 8 | 0 | 0.5 | 0.5 | 75 | 67 | 66 | 2.2 | 62 |
| Comparative 9 | 0.5 | 0 | 0.5 | 76 | 68 | 70 | 2.2 | 60 |
| Comparative 10 | 0.5 | 0.5 | 0 | 79 | 81 | 43 | 2.5 | 66 |
| Comparative 11 | 0 | 1 | 1 | 73 | 70 | 63 | 2.1 | 61 |
| Comparative 12 | 1 | 0 | 1 | 75 | 67 | 65 | 2.4 | 60 |
| Comparative 13 | 1 | 1 | 0 | 76 | 73 | 35 | 2.7 | 58 |
| Comparative 14 | 2 | 0 | 1 | 59 | 70 | 33 | 4.1 | 46 |
| Comparative 15 | 0 | 2 | 1 | 61 | 72 | 31 | 3.5 | 58 |
| Embodiment 1 | 0.5 | 0.5 | 1 | 83 | 82 | 86 | 0.6 | 84 |
| Embodiment 2 | 0.25 | 0.25 | 1 | 84 | 79 | 84 | 0.2 | 86 |
| Embodiment 3 | 2 | 0.25 | 1 | 82 | 83 | 81 | 0.8 | 80 |
| Embodiment 4 | 3 | 0.25 | 1 | 83 | 81 | 81 | 1.2 | 76 |
| Embodiment 5 | 5 | 0.25 | 1 | 79 | 75 | 75 | 1.5 | 71 |
| Embodiment 6 | 0.25 | 2 | 1 | 84 | 81 | 82 | 0.4 | 84 |
| Embodiment 7 | 0.25 | 3 | 1 | 84 | 75 | 80 | 0.4 | 85 |
| Embodiment 8 | 0.25 | 5 | 1 | 83 | 73 | 76 | 0.3 | 85 |
| Embodiment 9 | 0.5 | 0.5 | 0.25 | 81 | 81 | 77 | 0.9 | 81 |
| Embodiment 10 | 0.5 | 0.5 | 2 | 85 | 80 | 88 | 0.5 | 84 |
| Embodiment 11 | 0.5 | 0.5 | 3 | 85 | 79 | 88 | 0.5 | 83 |

TABLE 1-continued

| | VEC (mass %) | Succinic anhydride (mass %) | 1,3-dioxane (mass %) | Charging load property (%) | Cycle property | | 80° C. Preserving in charged state property | |
| --- | --- | --- | --- | --- | --- | --- | --- | --- |
| | | | | | Room temp. (%) | 60° C. (%) | Generated gas amount (ml) | Remaining capacity rate (%) |
| Embodiment 12 | 0.5 | 0.5 | 4 | 86 | 79 | 84 | 0.5 | 82 |
| Embodiment 13 | 0.5 | 0.5 | 5 | 86 | 74 | 76 | 0.5 | 83 |

From the results shown in Table 1, the following evaluations can be recognized. In the following evaluations, based on the result of the battery of Comparative Example 1 in which the electrolyte included no VEC, succinic anhydride or 1,3-dioxane, the results of the other batteries are evaluated. As the results of Comparative Examples 2 and 5 in which the additive is 1,3-dioxane only, with respect to charging load property, cycle property at 60° C. and remaining capacity rate at 80° C., satisfactory results were obtained; however, not only cycle property at room temperature was extremely impaired, but also the amount of generated gas was slightly higher.

As shown by the results of Comparative Examples 3 and 6 in which the additive is succinic anhydride only, cycle property at room temperature was advantageous; however, charging load property, cycle property at 60° C. and remaining capacity rate at 80° C. were impaired and the amount of generated gas was higher. Particularly, it was recognized that tendencies of the impairments of cycle property at 60° C. and remaining capacity rate at 80° C. and of the increase of the amount of generated gas were in proportion to the amount of succinic anhydride.

As shown by the results of Comparative Examples 4 and 7 in which the additive is VEC only, cycle property at room temperature was extremely advantageous and the advantageousness thereof was in proportion to the amount of VEC; however, charging load property, cycle property at 60° C. and remaining capacity rate at 80° C. were impaired and the amount of generated gas was extremely higher. It was recognized that tendencies of the impairments of charging load property, cycle property at 60° C. and remaining capacity rate at 80° C. and the increase of the amount of generated gas were in proportion to the amount of VEC.

Further, as shown by the results of Comparative Examples 8, 11 and 15 in which the additives include succinic anhydride and 1,3-dioxane only, cycle property at room temperature was extremely advantageous and the advantageousness thereof was in proportion to the amounts of succinic anhydride and 1,3-dioxane; however, charging load property, cycle property at 60° C. and remaining capacity rate at 80° C. were impaired and the amount of generated gas was extremely higher. It was recognized that tendencies of the impairments of charging load property, cycle property at 60° C. and remaining capacity rate at 80° C. and of the increase of the amount of generated gas were in proportion to the amounts of succinic anhydride and 1,3-dioxane.

As shown by the results of Comparative Examples 9, 12 and 14 in which the additives include VEC and 1,3-dioxane only, cycle property at room temperature was advantageous and the advantageousness thereof was in proportion to the amounts of VEC and 1,3-dioxane; however, charging load property, cycle property at 60° C. and remaining capacity rate at 80° C. were impaired and the amount of generated gas was higher. It was recognized that tendencies of the impairments of charging load property, cycle property at 60° C. and remaining capacity rate at 80° C. and of the increase of the amount of generated gas were in proportion to the amounts of VEC and 1,3-dioxane.

As shown by the results of Comparative Examples 10 and 13 in which the additives include VEC and succinic anhydride only, cycle property at room temperature was extremely advantageous, charging load property was satisfactory and remaining capacity rate at 80° C. was also satisfactory or impaired only slightly; however, cycle property at 60° C. was extremely impaired and the amount of generated gas was higher.

On the other hand, as shown by the results of Embodiments 1 to 8 in which the electrolyte included 1% by mass of 1,3-dioxane equally for Embodiments 1 to 8, VEC and succinic anhydride whose amounts were varied, all of the charging load property, cycle property at room temperature and remaining capacity rate were extremely excellent and the amount of generated gas was extremely small. Among them, as shown by the results of Embodiments 2 and 6 to 8 in which the electrolyte included 0.25% by mass of succinic anhydride equally and VEC whose amount was varied, it was recognized that accompanying the increase of the amount of VEC, the amount of generated gas had tendency to increase and remaining capacity rate at 80° C. had tendency to be lowered. As shown by the results of Embodiments 2 to 5 in which the electrolyte included 0.25% by mass of VEC equally and succinic anhydride whose amount was varied, it was recognized that accompanying the increase of the amount of succinic anhydride, cycle property at 60° C. had tendency to be slightly lowered.

As shown by the results of Embodiments 1 and 9 to 13 in which the electrolyte included 0.5% by mass of VEC and succinic anhydride each equally and 1,3-dioxane whose amount was varied, all of the charging load property, cycle property at room temperature and remaining capacity rate were extremely excellent and the amount of generated gas was extremely small. It was also recognized that cycle property at room temperature had tendency to be slightly lowered accompanying the increase of the amount of 1,3-dioxane and cycle property at 60° C. exhibited a maximum value between 2% by mass and 3% by mass of 1,3-dioxane.

Accordingly, from the results of Embodiments 1 to 13 and Comparative Examples 1 to 15 described above, it was found that by incorporating not only VEC and succinic anhydride, but also 1,3-dioxane in the electrolyte, a nonaqueous secondary battery can be obtained in which charging load property, cycle property at room temperature, cycle property at 60° C.

and remaining capacity rate at 80° C. are excellent, and the amount of generated gas during the preservation of the battery in a charged state is small.

While only the data of the batteries in which the minimum amount of VEC, succinic anhydride and 1,3-dioxane each is 0.25% by mass and the maximum amount thereof is 5% by mass have been shown, it has been found that, the effect of incorporating these compounds can be observed with these compounds each of 0.01% by mass, and the effect of incorporating them is recognized to be distinctly advantageous with the compounds each of 0.05% by mass.

Since the increase of the amount of VEC leads to decreasing cycle property at room temperature, cycle property at 60° C. and remaining capacity rate at 80° C. and the increasing amount of generated gas, the amount of VEC is preferably 10% by mass or less. Since the increase of the amount of succinic anhydride leads to decreasing cycle property at room temperature and cycle property at 60° C., the amount of succinic anhydride is preferably 10% by mass or less. The amount of VEC and succinic anhydride each is more preferably 0.05 to 5% by mass. It is assumed that accompanying with the increase of the amounts of VEC and succinic anhydride, cycle property at room temperature and cycle property at 60° C. are lowered, because VEC and succinic anhydride both have a high reduction potential and are unstable in the negative electrode to be decomposed, so that when their amounts exceed an appropriate level, a coating having a low ion-permeability and high resistance is likely to be formed.

Further, since the increase of the amount of 1,3-dioxane leads to decreasing charging load property and cycle property at 60° C., the amount thereof is preferably 10% by mass or less. The amount of 1,3-dioxane is more preferably 0.05% by mass to 5% by mass. It is assumed that since charging load property becomes more advantageous accompanying with the increase of the amount of 1,3-dioxane, decreasing cycle property at room temperature and cycle property at 60° C. accompanying with the increase of the amount of 1,3-dioxane are due to the increase of the positive electrode coating resistance, unlike the case of the increasing amounts of VEC and succinic anhydride.

EMBODIMENTS 14 TO 25

In Embodiments 14 to 25, influences of changing the types of VEC derivatives, cyclic acid anhydrides and cyclic ether derivatives on the battery properties were examined. In all of Embodiments 14 to 25, the electrolyte included 0.5% by mass (equally) of a VEC derivative and a cyclic acid anhydride each and 1% by mass (equally) of a cyclic ether derivative.

In Embodiments 14 to 19, each battery was produced using as a VEC derivative VEC itself, as a cyclic acid anhydride succinic anhydride and as a cyclic ether derivative 2-methyl-1,3-dioxane (Embodiment 14), 4-methyl-1,3-dioxane (Embodiment 15), 2,4-dimethyl-1,3-dioxane (Embodiment 16), 4-ethyl-1,3-dioxane (Embodiment 17), 1,3-dioxolane (Embodiment 18), 4-methyl-1,3-dioxolane (Embodiment 19).

In Embodiments 20 and 21, each battery was produced using as a cyclic acid anhydride succinic anhydride, as a cyclic ether derivative 1,3-dioxane and as a VEC derivative 4-ethenyl-4-methyl-1,3-dioxolane-2-one (4MVEC) (Embodiment 20) and 4-ethenyl-5-methyl-1,3-dioxolane-2-one (5MVEC) (Embodiment 21). In Embodiments 22 to 25, each battery was produced using as a VEC derivative VEC itself, as a cyclic ether derivative 1,3-dioxane and as a cyclic acid anhydride methylsuccinic anhydride (Embodiment 22), phenylsuccinic anhydride (Embodiment 23), glutaric anhydride (Embodiment 24) and diglycolic anhydride (Embodiment 25).

With respect to each of the thus prepared batteries in Embodiments 14 to 25, charging load property, cycle property at room temperature, cycle property at 60° C. and preserving in a charged state property at 80° C. were measured. The results thereof together with the results of Embodiment 1 and Comparative Example 1 are shown in Table 2.

TABLE 2

| | VEC derivative | | Cyclic acid anhydride | | 1,3-dioxane, 1,3-dioxolane derivative | | Charging load property (%) | Cycle property | | 80° C. Preserving in charged state property | |
|---|---|---|---|---|---|---|---|---|---|---|---|
| | | | | | | | | Room temp. (%) | 60° C. | Generated gas amount (ml) | Remaining capacity rate (%) |
| | Compound | Mass % | Compound | Mass % | Compound | Mass % | | | | | |
| Comparative 1 | None | 0 | None | 0 | None | 0 | 78 | 65 | 69 | 2.0 | 64 |
| Embodiment 1 | VEC | 0.5 | Succinic anhydride | 0.5 | 1,3-dioxane | 1 | 83 | 82 | 86 | 0.6 | 84 |
| Embodiment 14 | VEC | 0.5 | Succinic anhydride | 0.5 | 2-methyl-1,3-dioxane | 1 | 80 | 82 | 86 | 0.6 | 83 |
| Embodiment 15 | VEC | 0.5 | Succinic anhydride | 0.5 | 4-methyl-1,3-dioxane | 1 | 81 | 81 | 84 | 0.5 | 83 |
| Embodiment 16 | VEC | 0.5 | Succinic anhydride | 0.5 | 2,4-dimethyl-1,3-dioxane | 1 | 82 | 82 | 86 | 0.7 | 84 |
| Embodiment 17 | VEC | 0.5 | Succinic anhydride | 0.5 | 4-ethyl-1,3-dioxane | 1 | 79 | 80 | 85 | 0.5 | 84 |
| Embodiment 18 | VEC | 0.5 | Succinic anhydride | 0.5 | 1,3-dioxolane | 1 | 78 | 80 | 81 | 0.6 | 77 |
| Embodiment 19 | VEC | 0.5 | Succinic anhydride | 0.5 | 4-ethyl-1,3- | 1 | 77 | 79 | 78 | 0.4 | 79 |

TABLE 2-continued

| | VEC derivative | | Cyclic acid anhydride | | 1,3-dioxane, 1,3-dioxolane derivative | | Charging load property (%) | Cycle property | | 80° C. Preserving in charged state property | |
|---|---|---|---|---|---|---|---|---|---|---|---|
| | | | | | | | | Room temp. (%) | 60° C. | Generated gas amount (ml) | Remaining capacity rate (%) |
| | Compound | Mass % | Compound | Mass % | Compound | Mass % | | | | | |
| Embodiment 20 | 4MVEC | 0.5 | Succinic anhydride | 0.5 | 1,3-dioxane | 1 | 78 | 79 | 81 | 0.6 | 84 |
| Embodiment 21 | 5MVEC | 0.5 | Succinic anhydride | 0.5 | 1,3-dioxane | 1 | 77 | 81 | 82 | 0.7 | 83 |
| Embodiment 22 | VEC | 0.5 | Methyl succinic anhydride | 0.5 | 1,3-dioxane | 1 | 80 | 82 | 83 | 0.5 | 84 |
| Embodiment 23 | VEC | 0.5 | Phenyl succinic anhydride | 0.5 | 1,3-dioxane | 1 | 76 | 80 | 85 | 0.8 | 80 |
| Embodiment 24 | VEC | 0.5 | Glutaric anhydride | 0.5 | 1,3-dioxane | 1 | 77 | 79 | 80 | 0.9 | 78 |
| Embodiment 25 | VEC | 0.5 | Diglycolic anhydride | 0.5 | 1,3-dioxane | 1 | 84 | 85 | 82 | 1.2 | 76 |

4MVEC: 4-ethenyl-4-methyl-1,3-dioxolane-2-one
5MVEC: 4-ethenyl-5-methyl-1,3-dioxolane-2-one According to the results shown in Table 2, it can be recognized that when three components, namely, a VEC derivative, a cyclic acid anhydride and a cyclic ether derivative coexist in the electrolyte, independent of the types of the VEC derivative, cyclic acid anhydride and cyclic ether derivative, a nonaqueous secondary battery can be obtained in which in comparison with the nonaqueous secondary battery in Comparative Example 1, charging load property, cycle property at room temperature, cycle property at 60° C. and remaining capacity rate at 80° C. are more advantageous and the amount of generated gas during the reservation of the battery in a charged state is small.

What is claimed is:

1. A nonaqueous secondary battery comprising:
a negative electrode using a negative electrode active material containing a carbonaceous material capable of reversibly intercalating and deintercalating lithium, or a mixture of the carbonaceous material and at least one selected from the group consisting of lithium, lithium alloys and metal oxides capable of intercalating and deintercalating lithium;
a positive electrode using a positive electrode active material capable of reversibly intercalating and deintercalating lithium; and
a nonaqueous electrolyte;

the nonaqueous electrolyte containing:
(1) a vinyl ethylene carbonate derivative represented by Formula (I):

[Chemical 1]

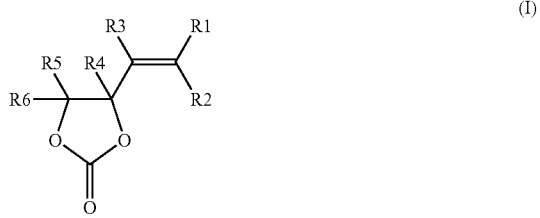

(I)

wherein R1 to R6 independently represent a hydrogen atom or an alkyl group having a carbon number of 1 to 4;
(2) a cyclic acid anhydride; and
(3) at least one cyclic ether derivative selected from the group consisting of 1,3-dioxanes, 1,3-dioxolanes and derivatives thereof,
wherein the cyclic acid anhydride is at least one compound selected from the group consisting of succinic anhydride, methylsuccinic anhydride, 2,2-dimethylsuccinic anhydride, glutaric anhydride, 1,2-cyclohexanedicarboxylic anhydride, cis-1,2,3,6-tetrahydrophthalic anhydride, cis-5-norbornene-endo-2,3-dicarboxylic anhydride, phenylsuccinic anhydride, 2-phenylglutaric anhydride and nonenylsuccinic anhydride.

2. The nonaqueous secondary battery according to claim 1, wherein the vinyl ethylene carbonate derivative is at least one compound selected from the group consisting of 4-ethenyl-1,3-dioxolane-2-one (vinyl ethylene carbonate), 4-ethenyl-4-methyl-1,3-dioxolane-2-one, 4-ethenyl-4-ethyl-1,3-dioxolane-2-one, 4-ethenyl-4-n-propyl-1,3-dioxolane-2-one, 4-ethenyl-5-methyl-1,3-dioxolane-2-one, 4-ethenyl-5-ethyl-1,3-dioxolane-2-one and 4-ethenyl-5-n-propyl-1,3-dioxolane-2-one.

3. The nonaqueous secondary battery according to claim 2, wherein the amount of the vinyl ethylene carbonate derivative is 0.01% by mass to 10.0% by mass relative to the mass of the total amount of the electrolyte.

4. The nonaqueous secondary battery according to claim 1, wherein the amount of the vinyl ethylene carbonate derivative is 0.01% by mass to 10.0% by mass relative to the mass of the total amount of the electrolyte.

5. The nonaqueous secondary battery according to claim 1, wherein the amount of the cyclic acid anhydride is 0.01% by mass to 10.0% by mass relative to the mass of the total amount of the electrolyte.

6. The nonaqueous secondary battery according to claim 1, wherein the cyclic ether derivative is at least one compound selected from the group consisting of 1,3-dioxane, 2-methyl-1,3-dioxane, 4-methyl-1,3-dioxane, 2,4-dimethyl-1,3-dioxane, 4-ethyl-1,3-dioxane, 1,3-dioxolane, 2-methyl-1,3-dioxolane and 4-methyl-1,3-dioxolane.

7. The nonaqueous secondary battery according to claim 6, wherein the amount of the cyclic ether derivative is 0.01% by mass to 10.0% by mass relative to the mass of the total amount of the electrolyte.

8. The nonaqueous secondary battery according to claim 1, wherein the amount of the cyclic ether derivative is 0.01% by mass to 10.0% by mass relative to the mass of the total amount of the electrolyte.

\* \* \* \* \*